Patented Apr. 5, 1932

1,852,787

UNITED STATES PATENT OFFICE

PAUL I. MURRILL, OF EAST NORWALK, CONNECTICUT, ASSIGNOR TO R. T. VANDERBILT COMPANY, INCORPORATED, OF NEW YORK, N. Y., A CORPORATION OF NEW YORK

FATTY OIL COMPOSITIONS

No Drawing. Application filed March 4, 1930. Serial No. 433,179.

This invention relates to improved animal and vegetable oil and fat compositions. The new oil and fat compositions comprise a small amount of a stabilizer in addition to the oil or fat. This stabilizer prevents or retards or inhibits the change in composition which oils and fats containing no stabilizer undergo on ageing. The stabilizers contemplated by this invention are particularly valuable, since oils and fats containing such stabilizers do not darken on ageing, or darken only slightly. The stabilizers tend to prevent the oils and fats from becoming rancid, reduce the percentage increase in oleic acid which oils and fats ordinarily undergo on ageing and reduce the amount of oxygen absorbed by the oils and fats on ageing.

According to this invention, animal and vegetable oils and fats are stabilized by the addition of a small amount of a phenolate prepared from a phenyl phenol and a base, the base itself being a stabilizer for animal and vegetable oils and fats. The stabilizers of this invention include the phenolates resulting from the interaction of a phenyl phenol such as 2-hydroxy-diphenyl or 4-hydroxy-diphenyl with diphenylguanidine or triethanol amine or an alkylene diaryl diamine such as ethylene diphenyl diamine. Mixtures of these phenolates may be employed.

I do not claim oils and fats stabilized by the addition of either a phenyl phenol or a base such as those mentioned. I claim as my invention oils and fats which are stabilized by the addition of a phenolate prepared by interacting a phenyl phenol with such a base. If a small amount of a phenolate of this type, for example, a few tenths of a percent, is added to an oil or fat, the oil or fat will not absorb oxygen on ageing as rapidly as the unstabilized product, rancidity will be prevented or retarded or inhibited, the formation of oleic acid is retarded, or particularly the oil or fat is stabilized in such a way that on ageing it does not rapidly become dark in color.

An oil such as cotton seed oil or corn oil or other oil or fat containing a fatty acid glyceride, can be stabilized by the addition of a phenolate of the kind described. Although the phenolate prepared either from the interaction of 2-hydroxy-diphenyl and an alkylene diaryl diamine or from the interaction of 4-hydroxy-diphenyl and an alkylene diaryl diamine is useful in stabilizing an oil or fat, the phenolate prepared from 4-hydroxy-diphenyl and ethylene diphenyl diamine is to be preferred to the phenolate prepared from 2-hydroxy-diphenyl and ethylene diphenyl diamine, particularly when a light colored oil or fat is desired. One or two tenths of one percent of the phenolate from 4-hydroxy-diphenyl and ethylene diphenyl diamine has given very satisfactory results in cotton seed oil.

The stabilizers contemplated by this invention, prepared by the interaction of a phenyl phenol with a base are better stabilizers than either the penhyl phenol or the base alone and they have melting points, etc. distinct from both the phenyl phenol and the base. This identifies them as distinct chemical compounds and they are referred to herein as phenolates. Such phenolates may be prepared by causing either 2-hydroxy-diphenyl or 4-hydroxy-diphenyl to react with diphenylguanidine or triethanol amine or an alkylene diaryl diamine such as ethylene, propylene, trimethylene, tetramethylene, or pentamethylene diaryl diamine of which the aryl groups may be phenyl or substituted phenyl or naphthyl, etc.

The stabilizer may advantageously be added to the fat or oil dissolved in a suitable amount of a low boiling solvent such as benzol or toluol. After the solution of the stabilizer is stirred into the oil or fat, the resulting composition may be heated to volatilize the solvent.

I claim:—

1. Stabilized animal and vegetable oil and fat compositions including in addition to the oil or fat a phenyl phenolate prepared by reacting a phenyl phenol with an organic chemical base having alkaline properties which itself stabilizes animal or vegetable oils and fats.

2. Stabilized animal and vegetable oil and fat compositions comprising a fatty acid glyceride and a small amount of phenyl phenolate prepared by reacting a phenyl phenol with a base which is a member of the group comprising diphenylguanidine, triethanol amine and the alkylene diaryl diamines.

3. Stabilized animal and vegetable oil and fat compositions comprising in addition to the oil or fat a small amount of a phenyl phenolate prepared by reacting a phenyl phenol with an alkylene diaryl diamine.

4. Stabilized animal and vegetable oil and fat compositions comprising in addition to the oil or fat a small amount of the phenyl phenolate prepared by reacting a phenyl phenol with diphenylguanidine.

5. Stabilized animal and vegetable oil and fat compositions comprising in addition to the oil or fat a small amount of a phenyl phenolate prepared by reacting a phenyl phenol with triethanol amine.

6. Stabilized animal and vegetable oil and fat compositions comprising in addition to the oil or fat a small amount of the phenyl phenolate prepared from 4-hydroxy-diphenyl and an alkylene diaryl diamine.

7. Stabilized cotton seed oil having mixed therewith a fraction of a percent of the phenyl phenolate prepared by reacting 4-hydroxy-diphenyl with ethylene diphenyl diamine.

8. Stabilized animal and vegetable oil and fat compositions comprising in addition to the oil or fat a small amount of a phenyl phenolate prepared by reacting 4-hydroxy-diphenyl with ethylene diphenyl diamine.

9. Stabilized animal and vegetable oil and fat compositions comprising in addition to the oil or fat a small amount of phenyl phenolate prepared by reacting 4-hydroxy-diphenyl with an organic chemical base having alkaline properties which itself stabilizes animal and vegetable oil and fat compositions.

10. In the method of making stabilized animal and vegetable oil and fat compositions, the step which comprises adding to the composition a small amount of phenyl phenolate prepared by reacting a phenyl phenol with an organic chemical base having alkaline properties which itself serves to stabilize animal and vegetable oil and fat compositions.

11. In the method of making stabilized animal and vegetable oil and fat compositions, the step which comprises adding to the composition a small amount of phenyl phenolate prepared by reacting an hydroxy-diphenyl with an organic chemical base having alkaline properties which itself serves to stabilize animal and vegetable oil and fat compositions.

12. In the method of making stabilized animal and vegetable oil and fat compositions, the step which comprises adding to the composition a small amount of phenyl phenolate prepared by reacting a phenyl phenol with an alkylene diaryl diamine.

13. In the method of making stabilized animal and vegetable oil and fat compositions, the step which comprises adding to the composition a small amount of phenyl phenolate prepared by reacting a phenyl phenol with ethylene diphenyl diamine.

14. In the method of making stabilized animal and vegetable oil and fat compositions, the step which comprises adding to the composition a small amount of phenyl phenolate prepared by reacting a phenyl phenol with an alkylol amine.

15. In the method of making stabilized animal and vegetable oil and fat compositions, the step which comprises adding to the composition a small amount of phenyl phenolate prepared by reacting a phenyl phenol with triethanol amine.

16. In the method of making stabilized animal and vegetable oil and fat compositions, the step which comprises adding to the composition a small amount of phenyl phenolate prepared by reacting a phenyl phenol with diphenylguanidine.

In testimony whereof I affix my signature.

PAUL I. MURRILL.